United States Patent
Rohini et al.

(10) Patent No.: US 12,401,998 B2
(45) Date of Patent: Aug. 26, 2025

(54) METHODS AND SYSTEMS FOR IDENTIFYING AUSF AND ACCESSING RELATED KEYS IN 5G PROSE

(71) Applicant: Samsung Electronics Co., Ltd., Suwon-si (KR)

(72) Inventors: R Rohini, Bangalore (IN); Nivedya Parambath Sasi, Bangalore (IN); Rajavelsamy Rajadurai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 18/017,002

(22) PCT Filed: Jul. 23, 2021

(86) PCT No.: PCT/KR2021/009600
§ 371 (c)(1),
(2) Date: Jan. 19, 2023

(87) PCT Pub. No.: WO2022/019725
PCT Pub. Date: Jan. 27, 2022

(65) Prior Publication Data
US 2023/0354037 A1   Nov. 2, 2023

(30) Foreign Application Priority Data

Jul. 23, 2020  (IN) .............................. 202041031600
Jul. 16, 2021  (IN) .............................. 2020 41031600

(51) Int. Cl.
*H04W 12/0431* (2021.01)
*H04W 12/06* (2021.01)
(Continued)

(52) U.S. Cl.
CPC ....... *H04W 12/0431* (2021.01); *H04W 12/06* (2013.01); *H04W 12/08* (2013.01); *H04W 4/40* (2018.02); *H04W 88/04* (2013.01)

(58) Field of Classification Search
CPC ... H04W 12/0431; H04W 12/06; H04W 4/40; H04W 88/04
See application file for complete search history.

(56) References Cited

U.S. PATENT DOCUMENTS

2019/0174449 A1*  6/2019  Shan ..................... H04W 60/04
2019/0394792 A1   12/2019  Jeon et al.
(Continued)

FOREIGN PATENT DOCUMENTS

| CN | 110463333 A | 11/2019 |
| EP | 3 557 898 A1 | 3/2017 |
| WO | 2019/137553 A1 | 7/2019 |

OTHER PUBLICATIONS

3GPP; 3rd Generation Partnership Project; Technical Specification Group Services and System Aspects; Study on security architecture enhancements to Proximity Services (ProSe) User Equipment (UE)-to-network relay (Release 15); 3GPP TR 33.843 0.4.0 (Jan. 2018); XP 51382739 A; Jan. 26, 2018; Valbonne, France.
(Continued)

*Primary Examiner* — David J Pearson
(74) *Attorney, Agent, or Firm* — Jefferson IP Law, LLP

(57) ABSTRACT

Methods and systems for identifying AUSF and accessing related keys in 5G ProSe. The AUSF corresponding to a remote UE is identified by an AMF based on routing indicator or SKI. The AUSF is capable of key management of ProSe UE-to-Network relay communication. The AUSF authorizes the remote UE to access a 5G core network through one or more UE-to-network relays. The authorization of the remote UE is performed based on a SUPI corresponding to the remote UE. The SUPI is obtained from (Continued)

a UDM. Once the remote UE is authorized, the AUSF can derive keys that enable the remote UE to access the 5G core network through the one or more UE-to-network relays. The keys derived by the AUSF 803 can be referred to as authentication keys. The derived keys include REAR key, $K_{NR\_ProSe}$, $K_D$, and $K_{NRP}$.

19 Claims, 11 Drawing Sheets

(51) Int. Cl.
*H04W 12/08* (2021.01)
*H04W 4/40* (2018.01)
*H04W 88/04* (2009.01)

(56) References Cited

U.S. PATENT DOCUMENTS

| | | | |
|---|---|---|---|
| 2020/0068391 | A1 | 2/2020 | Liu et al. |
| 2020/0084028 | A1* | 3/2020 | Wang ............... H04W 12/037 |
| 2020/0305001 | A1* | 9/2020 | Li ........................ H04W 12/10 |
| 2020/0344359 | A1 | 10/2020 | Sun et al. |
| 2020/0344604 | A1* | 10/2020 | He ........................... H04L 9/30 |
| 2021/0051005 | A1* | 2/2021 | Kunz ................... H04W 12/04 |
| 2021/0337381 | A1* | 10/2021 | Paladugu ............. H04W 12/71 |
| 2021/0345104 | A1* | 11/2021 | Cheng ............. H04W 12/0433 |
| 2022/0225448 | A1* | 7/2022 | Li ........................ H04W 60/04 |
| 2023/0023571 | A1* | 1/2023 | Xing ..................... H04M 15/93 |
| 2023/0362637 | A1* | 11/2023 | Thiebaut ............... H04W 12/63 |

OTHER PUBLICATIONS

3GPP; 3rd Generation Partnership Project; Technical Specification Group Services and System Aspects; Study on security architecture enhancements to Proximity Services (ProSe) User Equipment (UE)-to-network relay (Release 15); 3GPP TR 33.843 V15.1.0 (Jun. 2018); Jun. 21, 2018; XP051473076 A; Valbonne, France.

Nokia et al.; New Solution for UE-to-Network Relay authorization; SA WG2 Meeting #139E; S2-2004033 (revision of 52-200xxxx); XP 52460832 A; Jun. 1-12, 2020; Nov. 8, 2019; Elbonia.

Interdigital Inc.; Solution for KI #3: Support of UE-to-Network Relay; SA WG2 Meeting #136; S2-1911798 (revision of S2-18xxxx); XP 51821873 A; Nov. 18-22, 2019; Nov. 8, 2019; Reno, US.

European Extended Search Report dated Nov. 8, 2023; European Appln. No. 21846414.7-1218 / 4169278 PCT/KR2021009600.

Apple; KI #5 New Sol Functional entities and triggers for initiating policy update for ProSe path selection; SA WG2 Meeting #139E; S2-2003836; (revision of S2-200xxxx); Jun. 1-12, 2020; Elbonia.

3GPP; 3rd Generation Partnership Project; Technical Specification Group Services and System Aspects; Procedures for the 5G System (5GS); Stage 2 (Release 16); 3GPP TS 23.502; V16.5.0; Jul. 2020; Valbonne, France.

LG Electronics et al.; KI#5, New Sol: Policy based path selection; SA WG2 Meeting #139E (e-meeting); S2-2003906; (revision of S2-20xxxxx); Jun. 1-12, 2020; Elbonia.

Huawei et al.; KI#1, #7, sol#18: update to support ProSe restricted discovery and event based ProSe direct discovery charging; SA WG2 Meeting #139E e-meeting; S2-2004721; (revision of S2-2004016r04); Jun. 1-12, 2020; Elbonia.

International Search Report with Written Opinion dated Oct. 26, 2021; International Appln. No. PCT/KR2021/009600.

Indian Office Action dated Jun. 27, 2022; Indian Appln. No. 202041031600.

* cited by examiner

【Figure 1】
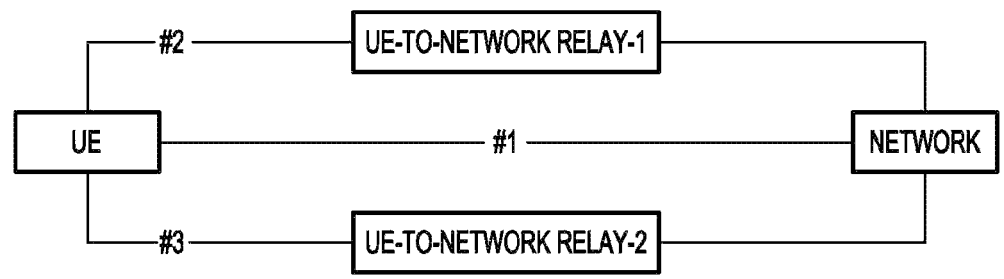
【Figure 2】
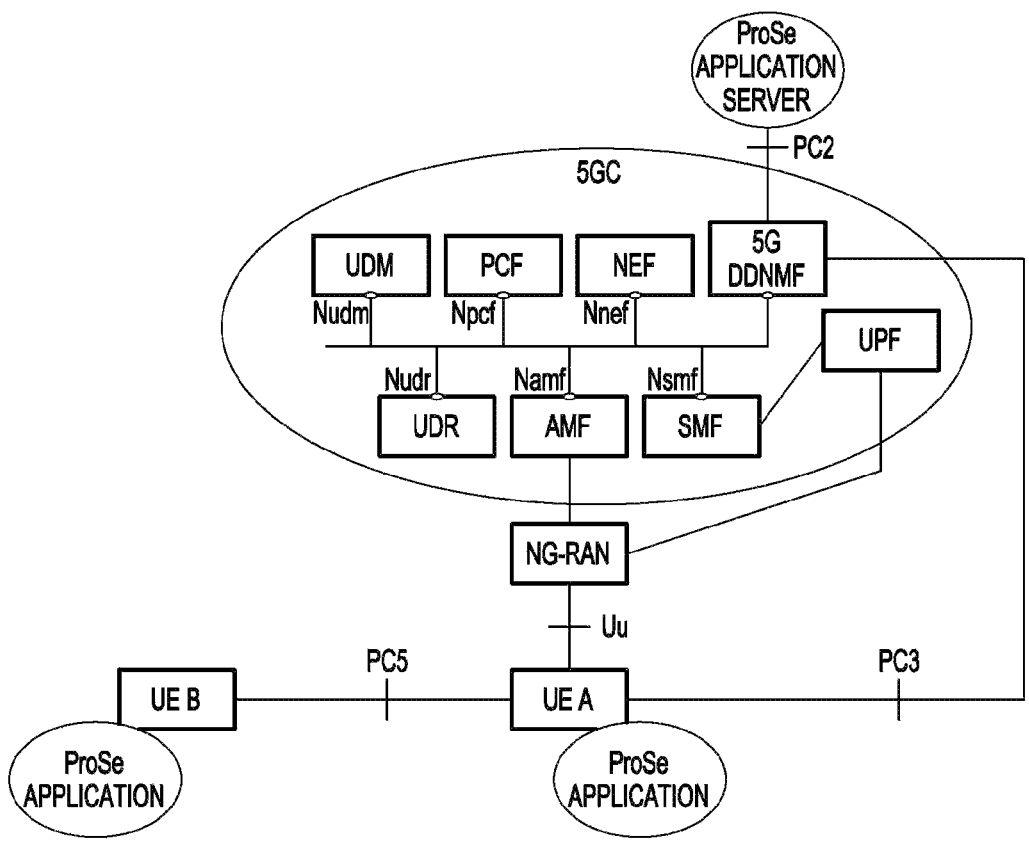

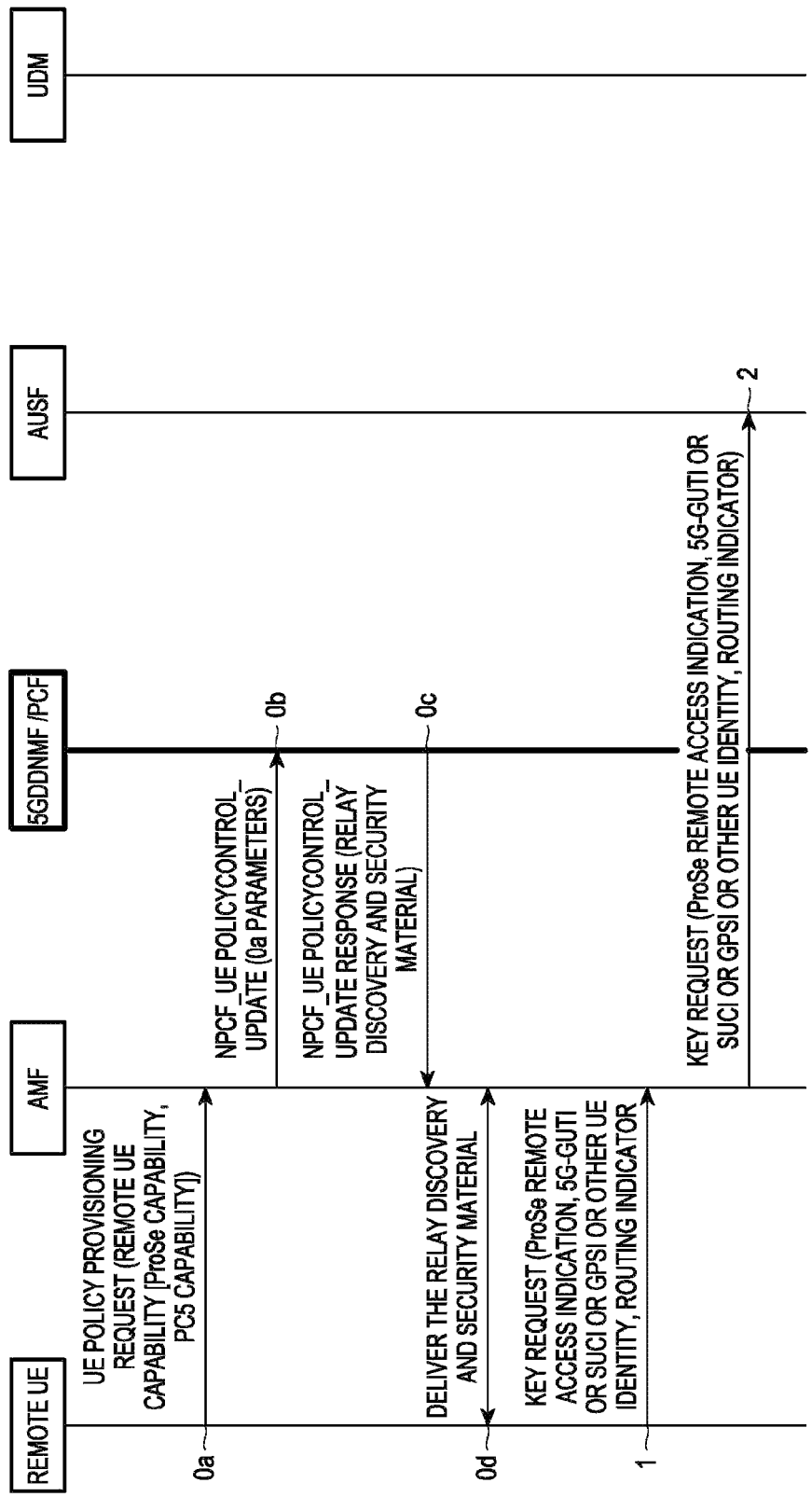
[Figure 3a]

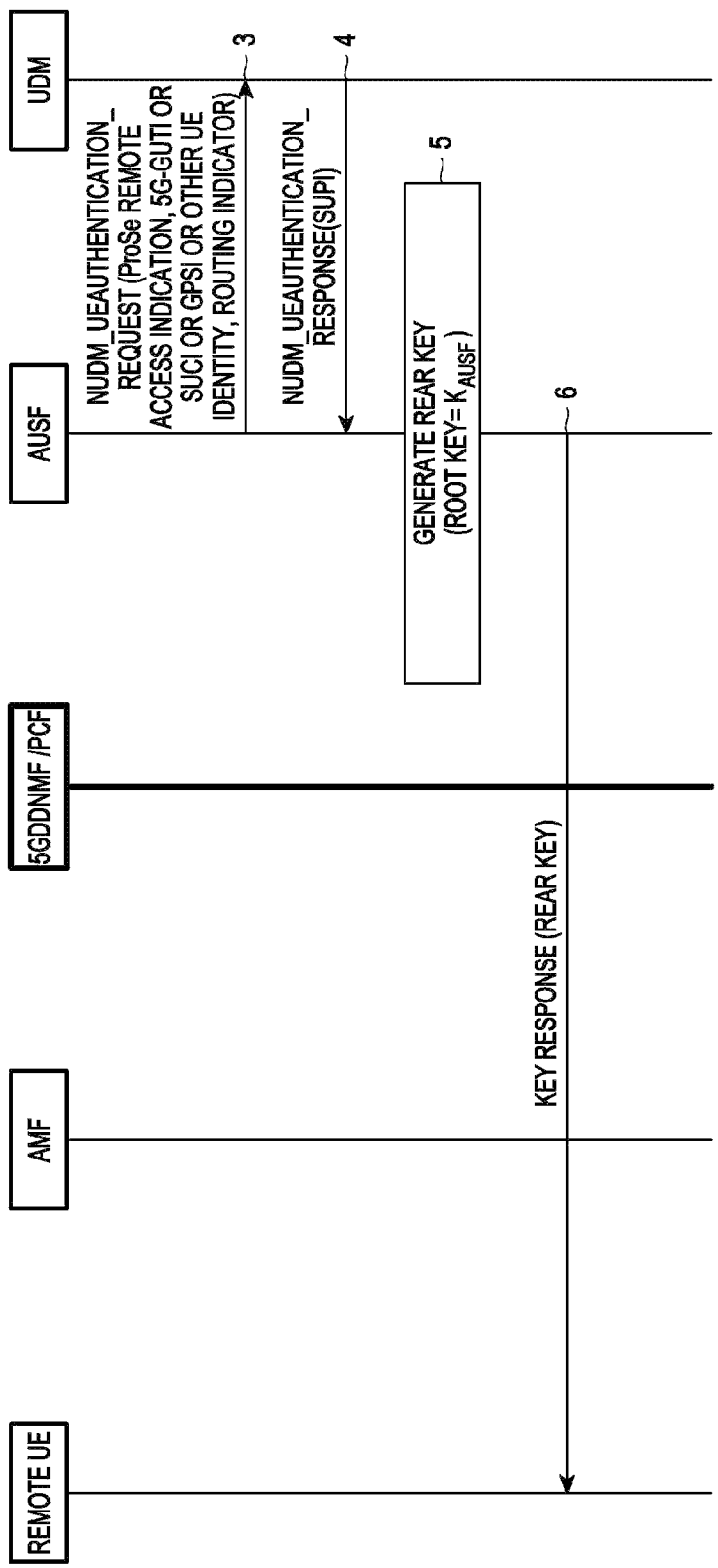
[Figure 3b]

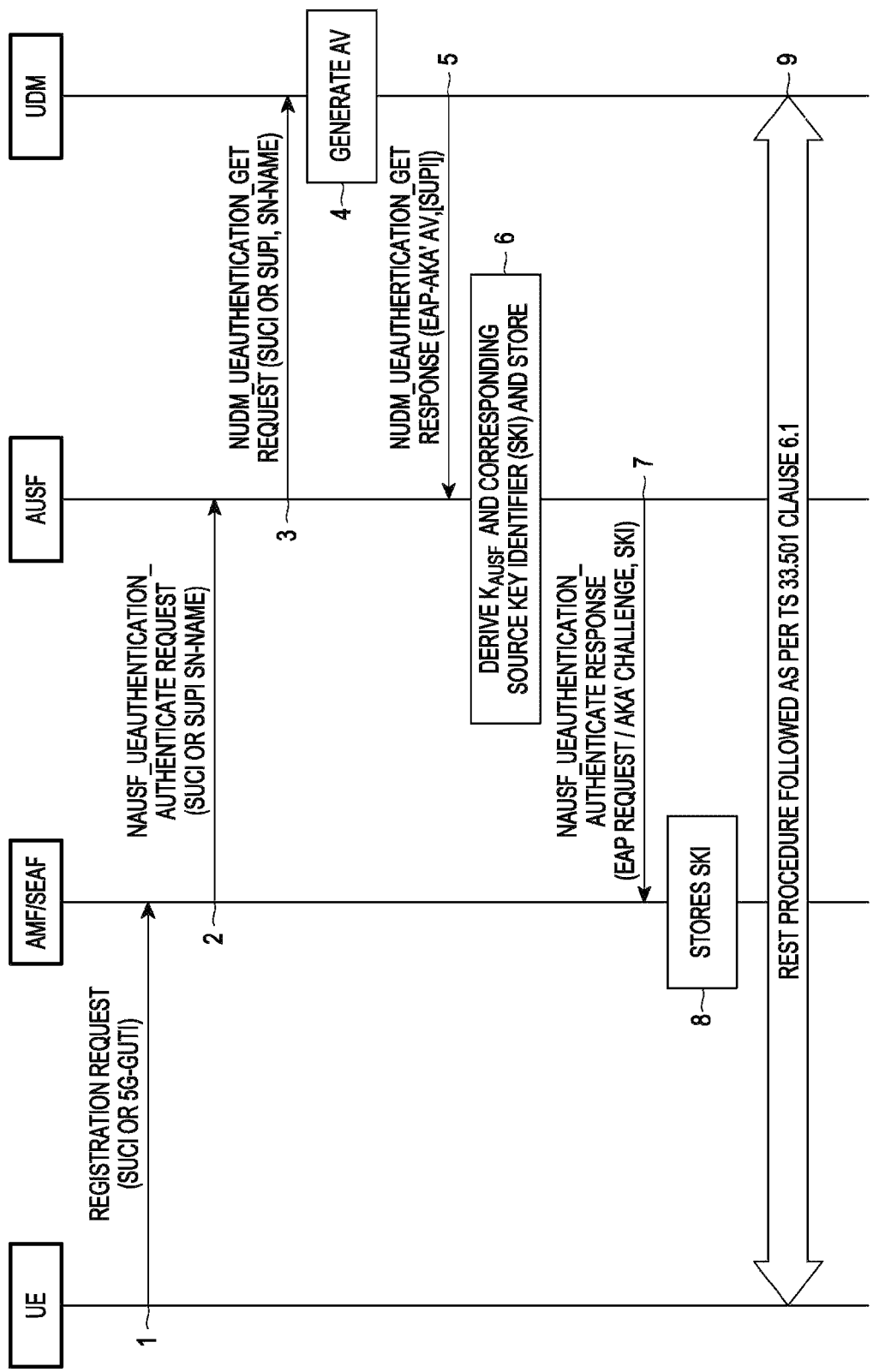
[Figure 4]

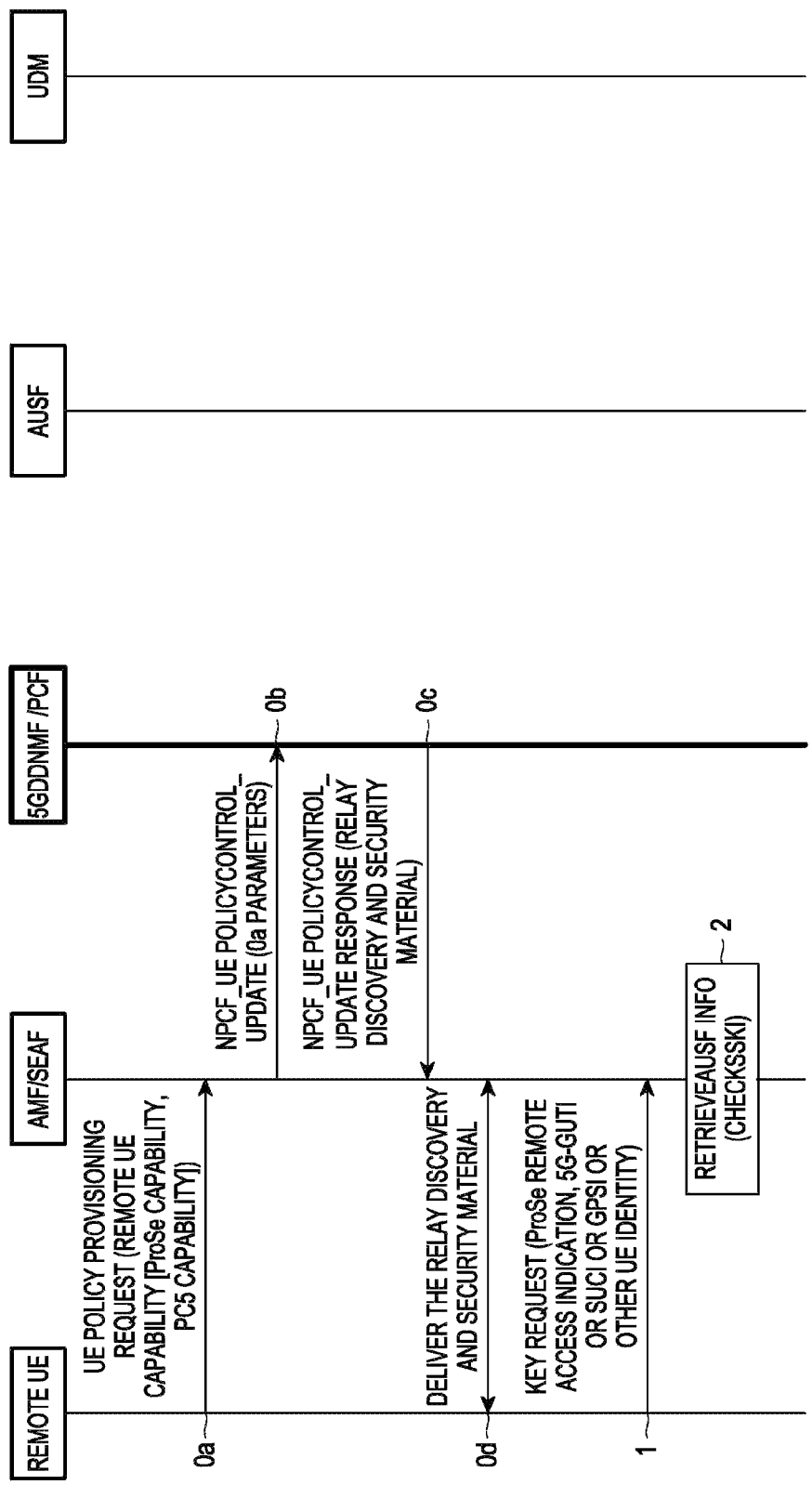

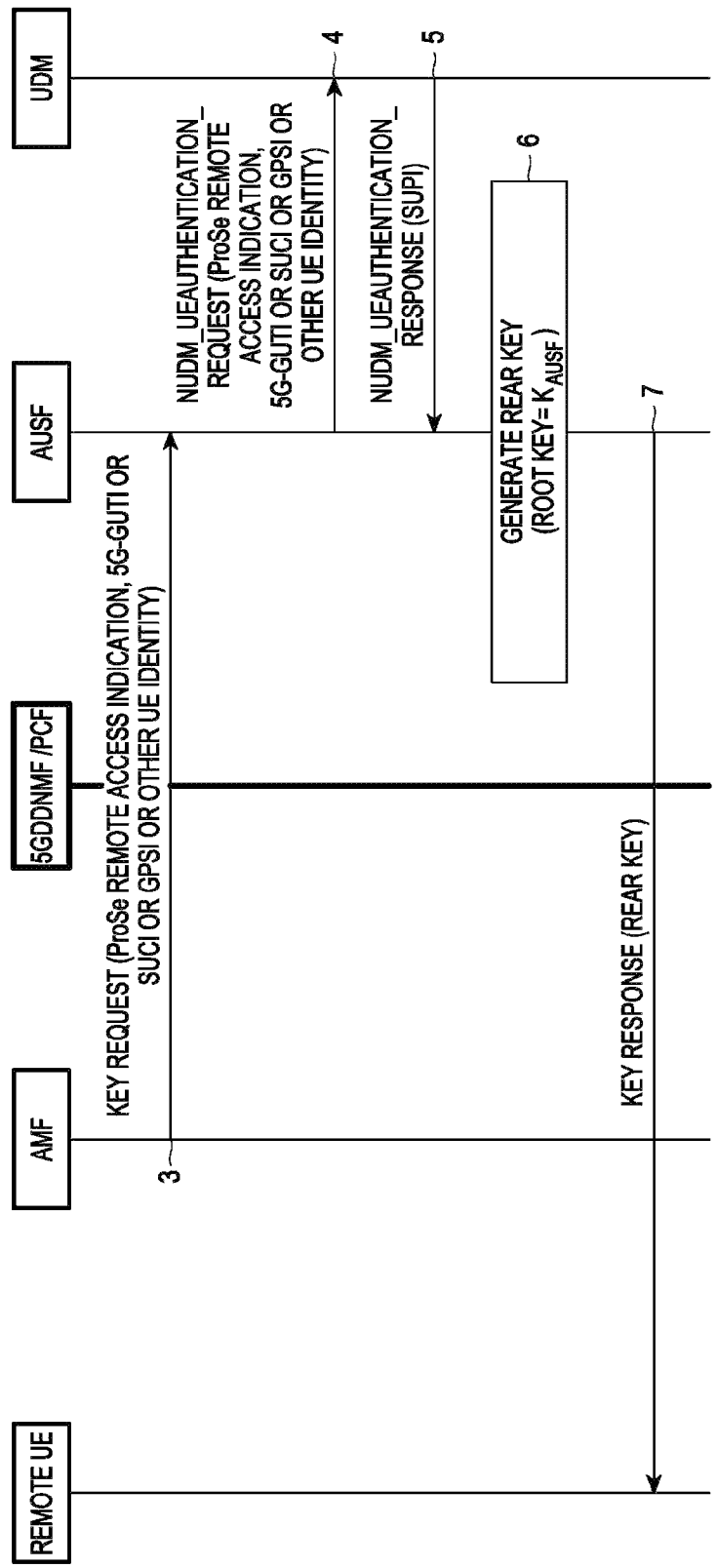
[Figure 5b]

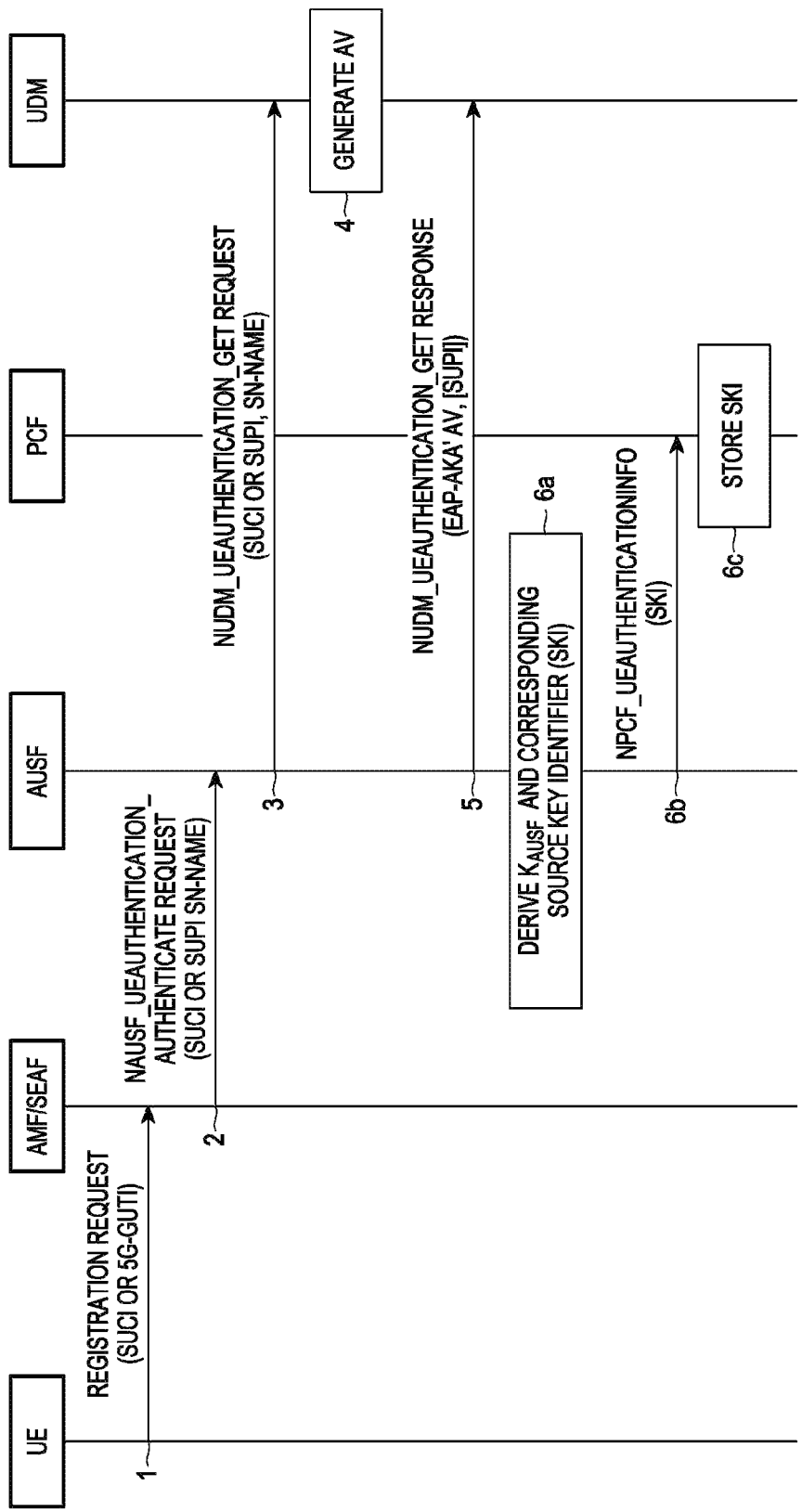
[Figure 6a]

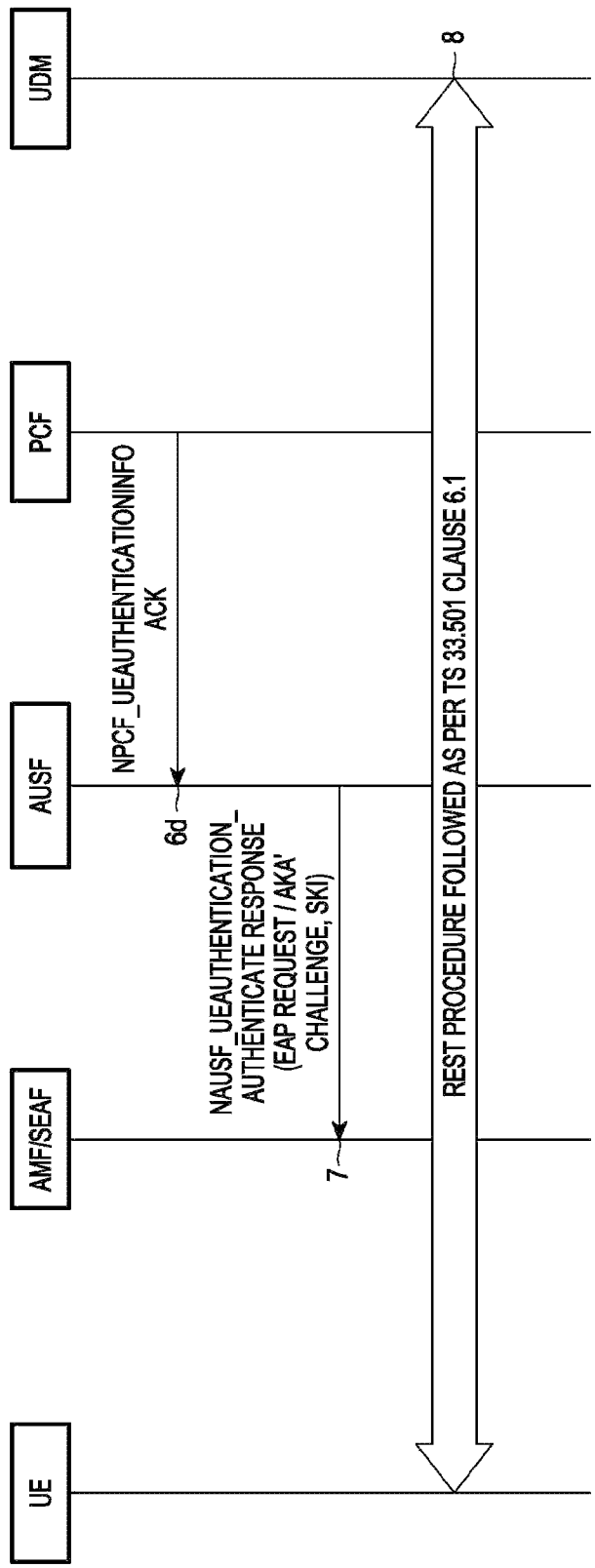
[Figure 6b]

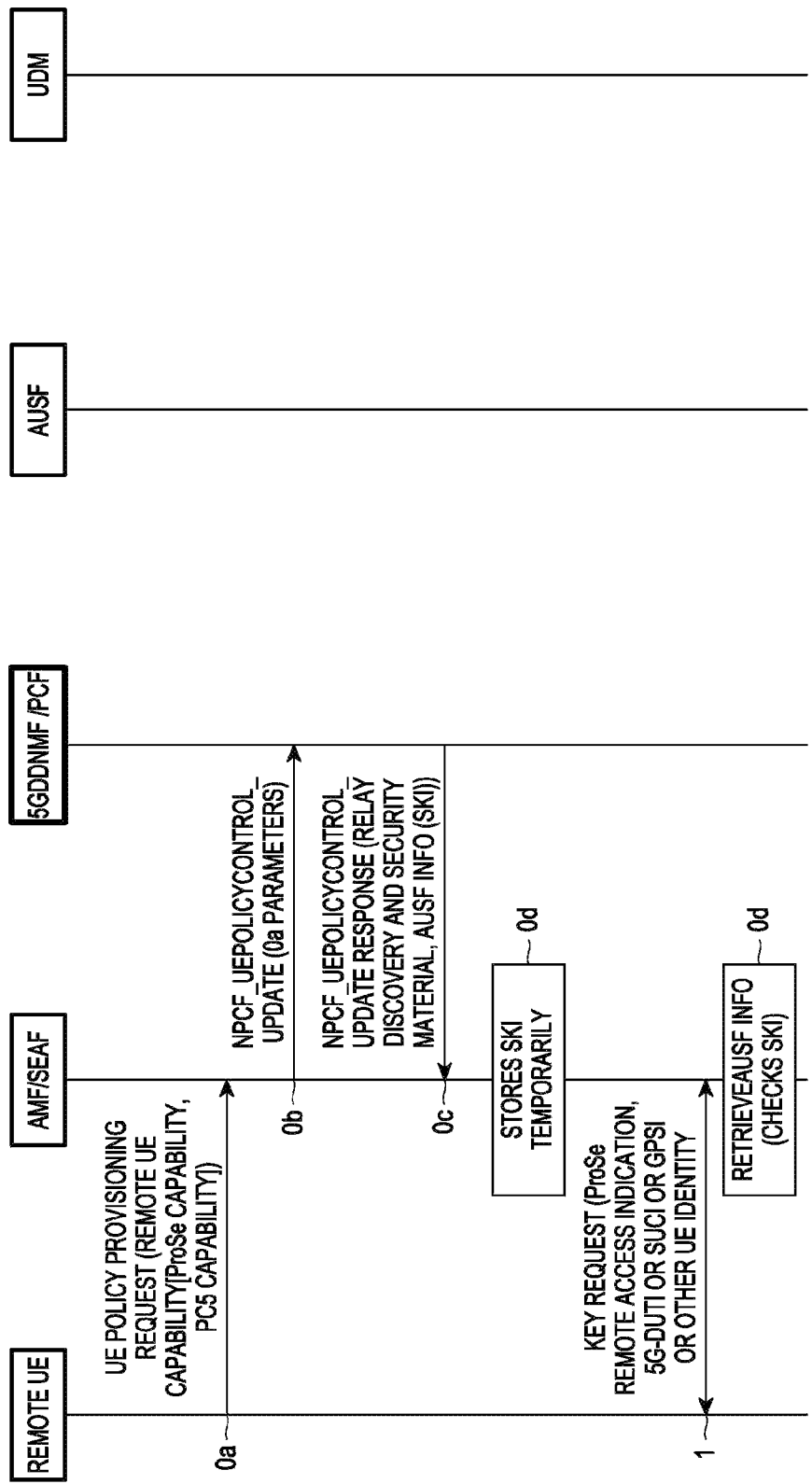
[Figure 7a]

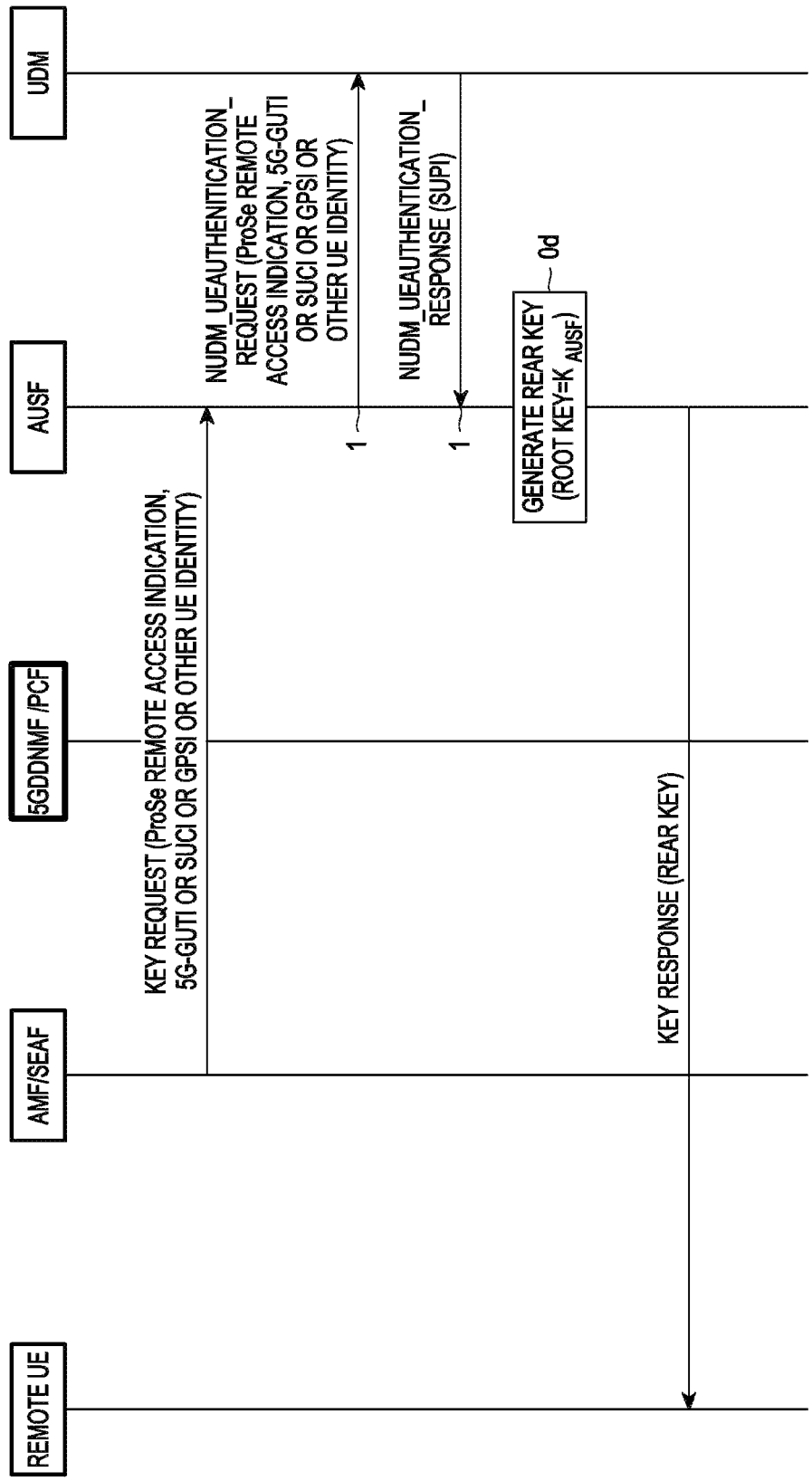
[Figure 7b]

【Figure 8】
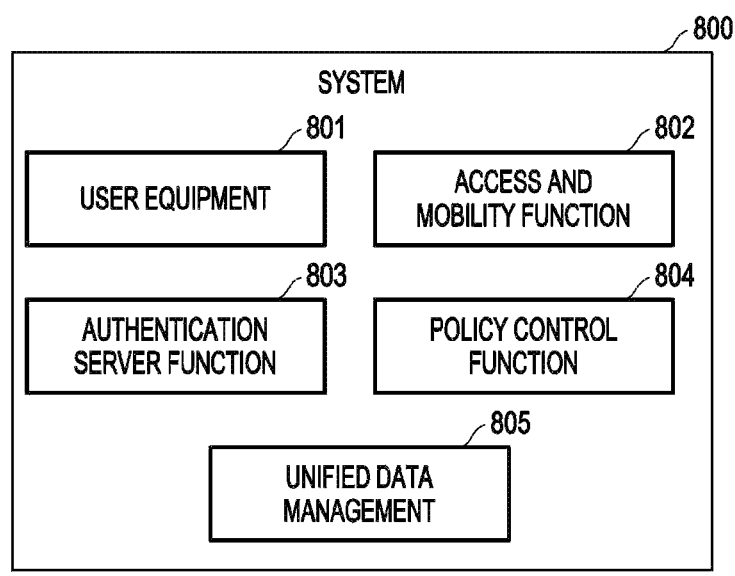

METHODS AND SYSTEMS FOR IDENTIFYING AUSF AND ACCESSING RELATED KEYS IN 5G PROSE

CROSS-REFERENCE TO RELATED APPLICATION(S)

This application is a U.S. National Stage application under 35 U.S.C. § 371 of an International application number PCT/KR2021/009600, filed on Jul. 23, 2021, which is based on and claims priority of an Indian Provisional application number 202041031600, filed on Jul. 23, 2020, in the Indian Intellectual Property Office, and of an Indian Complete patent application number 202041031600, filed on Jul. 16, 2021, in the Indian Intellectual Property Office, the disclosure of each of which is incorporated by reference herein in its entirety.

TECHNICAL FIELD

Embodiments herein relate to, and more particularly to methods and systems for identifying Authentication Server Function (AUSF) associated with a User Equipment (UE) and, receiving keys from the AUSF for availing Proximity Services (ProSe) in a $5^{th}$ Generation System (5GS).

BACKGROUND ART

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Proximity Services (ProSe), as described in the 3rd Generation Partnership Project (3GPP) specification comprises a wide variety of services, including public safety and interactive services. In order to avail ProSe, particularly public safety service and interactive service, support for New Radio (NR) PC5 ProSe communication, including unicast and groupcast, may be necessary. FIG. 1 depicts exemplary paths available to a User Equipment (UE) to access a $5^{th}$ Generation (5G) network for availing ProSe. The UE can access the 5G network through a direct Uu (interface) or an indirect Uu path. If a UE is in remote location and is unable to utilize the direct Uu path, i.e., path #1, one of the indirect Uu paths, i.e., path #2 and path #3, can be utilized for accessing the 5G network. As depicted in FIG. 1, if the UE accesses the 5G network through an indirect path, then the UE can utilize UE-to-Network Relays (#1 and #2), which are relay UEs.

User Plane (UP) based architecture allows introducing necessary functions in a 5G system for supporting ProSe. The UP based architecture includes a Direct Discovery Name Management Function (DDNMF) and a Direct Provisioning Function (DPF) for supporting ProSe in the 5G system. The DPF can be utilized for provisioning the UE with necessary parameters, which can be used by the UE for 5G ProSe Direct Discovery and 5G Prose Direct Communication. The DPF can be replaced by a Policy Control Function (PCF). The DDNMF can be involved in facilitating multiple procedures over a PC-3 interface. The procedures include Discovery Request/Response Procedure, wherein the DDNMF provides filters and Identities (IDs) for direct discovery; Match Report Procedure, wherein the DDNMF checks direct discovery and provides mapping information for direct discovery; Announcing Alert Procedure, wherein the DDNMF supports 'On-demand' ProSe Direct Discovery for ProSe restricted discovery model 'A'; and Discovery Update Procedure, wherein the DDNMF updates or revokes the previously allocated (for direct discovery) IDs and filters.

The 5G system supports Service-Based Architecture, and the DDNMF can be a Network Function (NF) in the 5G system. The DDNMF can interact with other 5G NFs (such as Unified Data Management (UDM) through Nudm interface) and connect with the UE through UP connectivity for supporting procedures over the PC-3 interface. FIG. 2 depicts an example UP based architecture and a position of a 5G DDNMF introduced in the 5G system. The DDNMF can be managed by one or more Mobile Network Operators (MNOs). The DDNMF can accept services from other NFs in the 5G system.

The system enhancement in the 5G system, by the System Aspects Working Group 2 (SA2), deals with the issues in UE-to-network relay communication and provides various candidate solutions to resolve or mitigate the issues. However, there can be limitations in security and privacy aspects of the resolutions. The SA2 provides candidate solutions for both layer-2 and layer-3 UE-to-network relay. There are security solutions provided by SA2, which can be adapted for PC-5 unicast communication in ProSe from 5G Vehicle-to-Everything (V2X).

DISCLOSURE

Technical Problem

Currently, V2X does not support relay communication (either UE-to-network (direct path) or UE-to-UE relay (indirect path)). For V2X security, the DPF is replaced by Policy Control Function (PCF). The V2X architecture may not support the DPF, due to a lack of support from the DDNMF. The architecture reference model can have additional considerations apart from checking direct discovery and providing mapping information for direct discovery. For example, the additional considerations may require each Public Land Mobile network (PLMN) deploying a logical DDNMF, wherein the DDNMF is having a capability to interact with the PCF for the authorization of the ProSe discovery service.

Long Term Evolution (LTE) ProSe Control Plane (CP) based solutions have been adopted for enabling support for UE to network relay communication. The LTE ProSe Key Management Function supports the key derivation required to support the UE-to-network relay communication, whereas 5G Authentication Server Function (AUSF) can support the functionality of key management function for UE-to-Network relay communication. In existing procedure, when UE needs to be directed to the AUSF, which can serve it for any 3GPP services (for example, Proximity Services, V2X, like so), there is no mechanism to identify the right AUSF.

Technical Solution

The principal aspect of the embodiments herein is to disclose methods and systems for identifying, by an Access and Mobility Function (AMF), an Authentication Server Function (AUSF) associated with a User Equipment (UE); generating keys, by the associated AUSF, on determining that the UE is authorized for availing Proximity Services (ProSe) from a $5^{th}$ Generation (5G) core network, and distributing the generated keys to the UE.

Another aspect of the embodiments herein is to identify the AUSF associated with the UE based on routing indicator, wherein the routing indicator can be provided by the UE; or a Source Key Identifier (SKI) associated with the UE, wherein the SKI can be provided by the AUSF associated with the UE.

Another object of the embodiments herein is to authorize the UE to access the 5G core network through one or more relay devices based on a Subscription Permanent Identifier (SUPI) associated with the UE, wherein the SUPI can be provided by a Unified Data Management (UDM).

Another aspect of the embodiments herein is to derive one or more authentication keys that allow the UE to access the 5G core network through the one or more relay devices, if the UE is authorized, and send the derived keys to the remote UE.

Accordingly, the embodiments provide methods and systems for identifying an Authentication Server Function (AUSF) corresponding to a User Equipment (UE), deriving authentication keys on determining that the UE is authorized to avail Proximity Services (ProSe), and distributing the authentication keys to the UE for enabling the UE to avail ProSe. The UE can be referred to as remote UE, since the UE requests for remote access to a $5^{th}$ Generation (5G) core network through one or more relay devices. In an embodiment, the AUSF corresponding to the remote UE can be identified based on routing indicator. In another embodiment, the AUSF can be identified based on a Source Key Identifier (SKI). The AUSF corresponding to the remote UE can be identified by an Access and Mobility Function (AMF).

The AUSF is responsible for key management of the ProSe UE-to-Network relay communication. The AUSF authorizes the remote UE to access the 5G core network through one or more relay devices. The remote UE can be authorized to remotely access the 5G core network based on a Subscription Permanent Identifier (SUPI) obtained from a Unified Data Management (UDM), wherein the SUPI obtained from the UDM corresponds to the remote UE. Once the authorization of the remote UE is completed, the AUSF can derive keys that allow the remote UE to access the 5G core network through the one or more relay devices. The keys derived by the AUSF include a Remote Access via Relay (REAR) key, a $K_{NR\_ProSe}$, a $K_D$, and a $K_{NRP}$. The AUSF can send the derived keys to the remote UE.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

DESCRIPTION OF DRAWINGS

Embodiments herein are illustrated in the accompanying drawings, throughout which like reference letters indicate corresponding parts in the various figures. The embodiments herein will be better understood from the following description with reference to the drawings, in which:

FIG. 1 depicts exemplary paths available to a User Equipment (UE) to access a $5^{th}$ Generation (5G) network for availing Proximity Services (ProSe);

FIG. 2 depicts an example User Plane (UP) based architecture and position of a Direct Discovery Name Management Function (DDNMF) introduced in the architecture;

FIG. 3a and FIG. 3b is a sequence diagram depicting identification of an Authentication Server Function (AUSF) associated with a UE, derivation of authentication keys by the AUSF on verifying the UE, and distribution of the authentication keys to the UE, according to embodiments as disclosed herein;

FIG. 4 is a sequence diagram depicting a framework of authentication of the UE with a 5G core network, wherein an Access and Mobility Function (AMF) of the 5G core network stores a Source Key Identifier (SKI), according to embodiments as disclosed herein;

FIG. 5a and FIG. 5b is another sequence diagram depicting identification of an AUSF associated with the UE, derivation of authentication keys by the AUSF on verifying the UE, and distribution of authentication keys to the UE, according to embodiments as disclosed herein;

FIG. 6a and FIG. 6b is a sequence diagram depicting another framework of authentication of the UE with the 5G core network, wherein a Policy Control Function (PCF) of the 5G core network stores the SKI during the UE authentication procedure, according to embodiments as disclosed herein;

FIG. 7a and FIG. 7b is yet another sequence diagram depicting the identification of an AUSF associated with the UE, derivation of authentication keys by the AUSF on verifying the UE, and distribution of the authentication keys to the UE, according to embodiments as disclosed herein; and FIG. 8 depicts an example system 400 configured to identify an AUSF associated with a remote UE, derive authentication keys, by the AUSF, on verifying the remote UE, and distribute the authentication keys to the remote UE, according to embodiments as disclosed herein.

MODE FOR INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for identifying an Authentication Server Function (AUSF) associated with the UE and, receiving keys, from the associated AUSF, for availing Proximity Services (ProSe) in a $5^{th}$ Generation System (5GS). Referring now to the drawings, and more particularly to FIGS. 3 through 8, where similar reference characters denote corresponding features consistently throughout the figures, there are shown preferred embodiments.

FIG. 3a and FIG. 3b is a sequence diagram depicting identification of an AUSF associated with a UE, derivation of authentication keys by the AUSF on verifying the UE, and distribution of the authentication keys to the UE, according to embodiments as disclosed herein. In an embodiment the AUSF is part of a core network of a 5G system (5G core network). The AUSF can support key management for UE-to-network relay. In an embodiment, one or more relay UEs can be discovered and utilized as the UE-to-network relay. The relay one or more UEs facilitate communication between the UE and the 5G core network. The UE can be referred to as remote UE. The AUSF has the capability to authorize the remote UE, which is requesting for remote access to the 5G core network.

In an embodiment, the ProSe communication may involve single hop relay i.e., one UE-to-Network relay between the remote UE and the 5G core network. In an embodiment, the ProSe communication can be a multiple hop relay communication, wherein a plurality of UE-to-Network relays are present in between the Remote UE and the 5G core network.

As depicted in FIG. 3a and FIG. 3b, consider that Policy Control Function (PCF) is having the capability of Direct Discovery Name Management Function (DDNMF). The procedure of authorization of the remote UE by the 5G core network involves a plurality of steps:

Step 0a-0d: The remote UE, seeking access to one or more UE-to-Network relays and (Remote Access via Relay key) REAR key, sends a UE policy provisioning request to an Access and Mobility Function (AMF). The request may include the capabilities of the remote UE, viz., ProSe capability, PC-5 capability, and so on. In an embodiment, the AMF can send a policy control update to the DDNMF or the PCF through service based interfaces (Nddnmf or Npcf). The AMF can send an N5gddnmf_UEpolicycontrol_update request message to the DDNMF or an Npcf_UEpolicycontrol_update request message over the service based interface. The messages allow the AMF to request for a policy required for ProSe UE Discovery, and materials relevant to the security of communication between the remote UE and a discovered UE-to-network relay.

The DDNMF can respond to the AMF by sending an N5gddnmf_UEpolicycontrol_update response, or the PCF to can respond to the AMF by sending or Npcf_UEpolicycontrol_update response. The UE policy control update response includes relevant information pertaining to discovery of a ProSe UE-to-network relay and security material for securing the communications between the remote UE and the ProSe UE-to-network relay. The AMF delivers the relevant information pertaining to discovery of the ProSe UE-to-network relay and the security material to the remote UE.

In another embodiment the remote UE can send a message directly to the DDNMF over the PC-3 interface to obtain the relevant information pertaining to the discovery of the ProSe UE-to-network relay and the security material meant for securing the communications between the remote UE and the ProSe UE-to-network relay.

Step 1: The remote UE, on receiving the information pertaining to the discovery of the ProSe UE-to-network relay and the security material, can send a key request message to the AMF, which is a Non-Access Stratum (NAS) message. The key request message includes a ProSe Remote access indication and a routing indicator. In an embodiment, the routing Indicator is assigned by a home network and provisioned in User Services Identity Module (USIM) for routing network signaling (comprising a Subscription Concealed Identifier (SUCI)) to the AUSF and a Unified Data Management (UDM). In an embodiment, the routing indicator is used for routing the key request message, sent by the remote UE, along with the SUCI. The AUSF is capable to serve the remote UE for UE-to-network remote communication.

The key request message includes a 5G Globally Unique Temporary Identity (GUTI), wherein the GUTI is included if the GUTI has already been assigned to the remote UE by the 5G core network. The key request message further includes the SUCI, a Generic Public Subscription Identifier (GPSI), or any other UE Identity (ID).

Once the routing indicator is sent to the AMF, by the remote UE, the ProSe Remote access indication can be set to 1. This can indicate that there is a single UE-to-Network relay between the remote UE and the 5G core network, and there is a single hop involved in ProSe communication. Similarly, if there are multiple UE-to-Network relays between the remote UE and the 5G core network, multiple hops may be required for ProSe communication.

Step 2: On receiving, the key request message from the UE, the AMF can forward the key request message to an AUSF that corresponds to the remote UE, and which is capable of key management for the ProSe UE-to-Network relay communication. In an embodiment, the AMF can utilize the routing indicator, sent by the remote UE in the key request message, for identifying the AUSF corresponding to the remote UE.

Step 3: Once the AUSF receives the forwarded key request message from the AMF, the AUSF can determine whether the actual sender of the key request message, i.e., the remote UE, is authorized to access the 5G core network through one or more UE-to-Network relay UEs. If the AUSF determines that the remote UE is an authorized UE, the AUSF may derive the REAR key and other additional keys for enabling the remote UE to secure communication with the 5G core network through the one or more UE-to-Network relay UEs, and providing the REAR key and the other additional keys to the remote UE.

In order to authorize the remote UE, requesting for the REAR key and the other additional keys, for remote access, the AUSF can send UE Authentication request, Nudm_UE-Authentication request, to the UDM, through the Nudm interface. The AUSF sends, through the Nudm interface, the UE Authentication request to the UDM for retrieving details pertaining to the remote UE and/or data subscription of the remote UE. The AUSF includes at least one of the ProSe remote access indication, the routing indicator, the 5G-GUTI, the SUCI, the GPSI, and the IDs relevant to the remote UE, in the Nudm_UEAuthentication request.

Step 4: On receiving the UE authentication request from the AUSF, the UDM can check whether the remote UE is authorized to access the 5G core network through one or more UE-to-network relays. In an embodiment, the UDM can store the GPSI (if received) and the routing indicator for authorizing the remote UE when communicating through the one or more UE-to-Network relay. If the UDM determines that the remote UE is authorized to access the 5G core network through the one or more UE-to-network relays, the UDM sends a Subscription Permanent Identifier (SUPI) to the AUSF, in a Nudm_UEAuthentication response message through the Nudm interface, which corresponds to the remote UE.

Step 5: On receiving the SUPI from the UDM, the AUSF can generate the REAR Key for enabling the remote UE to communicate with the 5G core network through the one or more UE-to-Network relays. The REAR key is utilized for deriving at least one additional ProSe key comprising the $K_{NR\_ProSe}$, the $K_D$, or the $K_{NRP}$.

Step 6: The AUSF can send the generated REAR key and the at least one additional ProSe key in a key response message to the remote UE through the AMF.

FIG. 4 is a sequence diagram depicting a framework of authentication of the UE with the 5G core network, wherein the AMF stores a Source Key Identifier (SKI), according to embodiments as disclosed herein. The framework of authentication of the UE with the 5G core network is defined in 3rd Generation Partnership Project (3GPP) specifications. The UE can be referred to as remote UE when availing ProSe. The authentication of the UE is as follows:

Step 1: The UE can send a registration request to the AMF or a Security Anchor Function (SEAF) in an N-1 message, which includes a SUCI or a 5G-GUTI (if available).

Step 2: When the SEAF initiates the authentication, the SEAF sends a Nausf_UEAuthentication_Authenticate Request message to the AUSF through the Nausf interface. The Nausf_UEAuthentication_Authenticate Request message includes at least one of SUCI, SUPI, and Serving Network name. On receiving the Nausf_UEAuthentication_Authenticate Request message, the AUSF can checks whether the requesting SEAF in the Serving Network is entitled to use the Serving Network name. The AUSF can compare the serving network name (which is included in the Nausf_UEAuthentication_Authenticate Request) with the expected serving network name.

Step 3: If the AUSF determines that the requesting SEAF in the Serving Network is entitled to use the Serving Network name, the AUSF can send a Nudm_UEAuthentication_Get Request message to the UDM. The Nudm_UE-Authentication_Get Request is send through the Nudm interface, and includes at least one of the SUCI, the SUPI, and the Serving Network-name. Based on the SUPI, the UDM or an Authentication Credential Repository and Processing Function (ARPF) can choose an authentication method, which can be utilized for authenticating the UE.

Step 4: The UDM/ARPF generates an Authentication Vector (AV). The UDM/ARPF can compute a ciphering key (CK') and an Integrity Key (IK') based on the AV.

Step 5: Once the AV is generated, the UDM can send a Nudm_UEAuthentication_Get Response message, which includes a transformed authentication vector, to the AUSF, from which the UDM received the Nudm_UEAuthentication_Get Request. The Nudm_UEAuthentication_Get Response includes at least one of the AV, an Extensible Authentication Protocol-Authentication and Key Agreement (EAP-AKA'), and the SUPI.

Step 6: Thereafter, the AUSF can derive a $K_{AUSF}$ and a Source Key Identifier (SKI), and store the $K_{AUSF}$ and the SKI.

In an embodiment, the AUSF derives the SKI and stores the SKI after a successful primary authentication of the UE. When the UE needs to be directed to the AUSF corresponding to the UE, i.e., the AUSF capable of verifying the UE for availing 3GPP services such as Proximity Services, V2X, and so on, the SKI can be utilized for identifying the AUSF capable of serving the UE (corresponding to the UE).

Step 7: The AUSF can send an EAP-Request/AKA'-Challenge and the SKI, in a Nausf_UEAuthentication_Authenticate Response message, to the AMF/SEAF Step 8: The AMF/SEAF can obtain the SKI from the AUSF and, thereafter, stores the SKI. The AMF can utilize the SKI for identifying the AUSF associated with the (remote) UE for enabling the UE to avail ProSe through one or more UE-to-Network relays (when the UE desires remote access).

In an embodiment, the SKI can be valid until the subsequent primary authentication. In another embodiment, the SKI can be valid until there is a valid native 5G Non Access Stratum security context and a valid Access Stratum security context.

FIG. 5a and FIG. 5b is another sequence diagram depicting the identification of an AUSF associated with a UE, derivation of authentication keys by the AUSF on verifying the UE, and distribution of the authentication keys to the UE, according to embodiments as disclosed herein. The AUSF can support key management for UE-to-network relay. In an embodiment, one or more relay UEs can be discovered and utilized as the UE-to-network relay. The relay one or more UEs facilitate communication between the UE and the 5G core network. The UE can be referred to as remote UE. The AUSF has the capability to authorize the remote UE, which is requesting for remote access to the 5G core network.

As depicted in FIG. 5a and FIG. 5b, consider that the PCF is having the capability of the DDNMF. The procedure of authorization of the remote UE by the 5G core network involves a plurality of steps:

Step 0a-0d: The remote UE, seeking access to one or more UE-to-Network relays and the REAR key, can send a UE policy provisioning request to an AMF. The request may include the capabilities of the remote UE, viz., ProSe capability, PC-5 capability, and so on. In an embodiment, the AMF can send a policy control update to the DDNMF or the PCF through service based interfaces. The AMF can send an N5gddnmf_UEpolicycontrol_update request message to the DDNMF through a service based interface or an Npcf_U-Epolicycontrol_update request message to the PCF through the Npcf interface. The messages allow the AMF to request for a policy required for ProSe UE Discovery, and materials relevant to the security of communication between the remote UE and a discovered UE-to-network relay.

The DDNMF can respond to the AMF by sending an N5gddnmf_UEpolicycontrol_update response, or the PCF to can respond to the AMF by sending or Npcf_UEpolicy-control_update response. The UE policy control update response includes relevant information pertaining to discovery of a ProSe UE-to-network relay and security material for securing the communications between the remote UE and the ProSe UE-to-network relay. The AMF delivers the relevant information pertaining to discovery of the ProSe UE-to-network relay and the security material to the remote UE.

In another embodiment the remote UE can send a message directly to the DDNMF over the PC-3 interface to obtain the relevant information pertaining to the discovery of the ProSe UE-to-network relay and the security material meant for securing the communications between the remote UE and the ProSe UE-to-network relay.

Step 1: The remote UE, on receiving the information pertaining to the discovery of the ProSe UE-to-network relay and the security material, can send a key request message to the AMF over a NAS message. The key request message can include a ProSe Remote access indication. The key request message can include a GUTI, wherein the GUTI is included if the GUTI has already been assigned to the remote UE by the 5G core network. The key request message further includes a SUCI, a GPSI, or any other UE ID.

Once the routing indicator is sent to the AMF, by the remote UE, the ProSe Remote access indication can be set to 1. This can indicate that there is a single UE-to-Network relay between the remote UE and the 5G core network, and there is a single hop involved in ProSe communication. Similarly, if there are multiple UE-to-Network relays between the remote UE and the 5G core network, multiple hops may be required for ProSe communication.

Step 2: On receiving, the key request message from the UE, the AMF can identify an AUSF that corresponds to (or is associated with) the remote UE. In an embodiment, the AMF can utilize the SKI stored in AMF, for identifying the AUSF corresponding to the remote UE. The AMF stores a mapping between at least one identifier of the remote UE and the SKI. The AMF can link the SKI with the remote UE based on this mapping. Once the link between the remote UE and the SKI is established by the AMF, the AMF can identify the AUSF corresponding to the remote UE, based on the SKI. The SKI allows AMF to distinguish and route the key request message to the AUSF corresponding to the remote UE. The AMF had obtained and stored the SKI, from the AUSF corresponding to the remote UE, during the primary (remote) UE authentication procedure with the 5G core network (as described in FIG. 4).

The format of the SKI is identical to the format of a next generation Key Set Identifier (ngKSI). The SKI comprises a type field and a value field. The type field indicates the AUSF associated with the remote UE. The value field can be a three-bit value. If the value field is '111' (decimal seven), then it indicates that $K_{AUSF}$ is not available. If the value field is '000', '001', '010', '011', '100', '101', or '110', then it indicates that $K_{AUSF}$ is available, and the $K_{AUSF}$ to which the SKI identifies.

Step 3: Once the AMF identifies the AUSF, the AMF can forward the key request message (comprising the ProSe Remote access indication, the GUTI (if assigned), the SUCI, the GPSI, the (remote) UE ID, and so on) to the AUSF. The AUSF is capable of key management for the ProSe UE-to-Network relay communication.

Step 4: Once the AUSF receives the forwarded key request message from the AMF, the AUSF can determine whether the actual sender of the key request message, i.e., the remote UE, is authorized to access the 5G core network through one or more UE-to-Network relay UEs. If the AUSF determines that the remote UE is an authorized UE, the AUSF may derive the REAR key and other additional keys for enabling the remote UE to secure communication with the 5G core network through the one or more UE-to-Network relay UEs, and providing the REAR key and the other additional keys to the remote UE.

In order to authorize the remote UE, requesting for the REAR key and the other additional keys, for remote access, the AUSF can send UE Authentication request, Nudm_UE-Authentication request, to the UDM, through the Nudm interface. The AUSF sends the UE Authentication request to the UDM for retrieving details pertaining to the remote UE and/or data subscription of the remote UE through the Nudm interface. The AUSF includes at least one of the ProSe Remote Access Indication, the 5G-GUTI (if assigned), the SUCI, the GPSI, and the IDs relevant to the remote UE, in the Nudm_UEAuthentication request.

Step 5: On receiving the UE authentication request from the AUSF, the UDM can check whether the remote UE is authorized to access the 5G core network through one or more UE-to-network relays. In an embodiment, the UDM can store the GPSI (if received) for authorizing the remote UE when communicating through the one or more UE-to-Network relay. If the UDM determines that the remote UE is authorized to access the 5G core network through the one or more UE-to-network relays, the UDM sends a SUPI to the AUSF, in a Nudm_UEAuthentication response message through the Nudm interface, which corresponds to the remote UE.

Step 6: On receiving the SUPI from the UDM, the AUSF can generate the REAR Key for enabling the remote UE to communicate with the 5G core network through the one or more UE-to-Network relays. The REAR key is utilized for deriving at least one additional ProSe key comprising the $K_{NR\_ProSe}$, the $K_D$, or the $K_{NRP}$.

Step 7: The AUSF can send the generated REAR key and the at least one additional ProSe key in a key response message to the remote UE through the AMF.

FIG. 6 is a sequence diagram depicting another framework of authentication of the UE with the 5G core network, wherein the PCF stores the SKI during the UE authentication procedure, according to embodiments as disclosed herein. This framework of authentication of the UE with the 5G core network is defined in 3GPP specifications. The UE can be referred to as remote UE when availing ProSe. The authentication of the UE is as follows.

Step 1: The UE can send a registration request to the AMF or SEAF in an N-1 message, which includes a SUCI or a 5G-GUTI (if available).

Step 2: When the SEAF initiates the authentication, the SEAF sends a Nausf_UEAuthentication_Authenticate Request message to the AUSF. The Nausf_UEAuthentication_Authenticate Request is send to the AUSF through the Nausf interface. The Nausf_UEAuthentication_Authenticate Request message includes at least one of SUCI, SUPI, and Serving Network name. On receiving the Nausf_UEAuthentication_Authenticate Request message, the AUSF can checks whether the requesting SEAF in the Serving Network is entitled to use the Serving Network name. The AUSF can compare the serving network name (which is included in the Nausf_UEAuthentication_Authenticate Request) with the expected serving network name.

Step 3: If the AUSF determines that the requesting SEAF in the Serving Network is entitled to use the Serving Network name, the AUSF can send a Nudm_UEAuthentication_Get Request message to the UDM. The Nudm_UE-Authentication_Get Request is send through the Nudm interface, and includes at least one of the SUCI, the SUPI, and the Serving Network-name. Based on the SUPI, the UDM can choose an authentication method, which can be utilized for authenticating the UE.

Step 4: The UDM/ARPF generates an AV. The UDM can compute a CK' and an IK' based on the AV.

Step 5: Once the AV is generated, the UDM can send a Nudm_UEAuthentication_Get Response message, which includes a transformed authentication vector, to the AUSF, from which the UDM received the Nudm_UEAuthentication_Get Request. The Nudm_UEAuthentication_Get Response includes at least one of the AV, an EAP-AKA', and the SUPI.

Steps 6a-6d: Thereafter, at step 6a, the AUSF can derive a $K_{AUSF}$ and a SKI. At step 6b, the AUSF can send the SKI to the PCF. The AUSF invokes an Npcf_UEAuthentication-Info service. The AUSF can send the SKI to the PCF through the Npcf interface. At step 6c, the PCF can store the SKI. At step 6d, the PCF sends an Npcf_UEAuthenticationInfo-Acknowledgement message to the AUSF for acknowledging that the PCF has received the SKI, and has stored the SKI.

Step 7: The AUSF can send an EAP-Request/AKA'-Challenge and the SKI, in a Nausf_UEAuthentication_Authenticate Response message, to the AMF/SEAF.

FIG. 7a and FIG. 7b is yet another sequence diagram depicting the identification of an AUSF associated with a UE, derivation of authentication keys by the AUSF on verifying the UE, and distribution of the authentication keys to the UE, according to embodiments as disclosed herein. The UE can be referred to as remote UE. The AUSF has the capability to authorize the remote UE, which is requesting for remote access to the 5G core network.

As depicted in FIG. 7a and FIG. 7b, consider that the PCF is having the capability of the DDNMF. The procedure of authorization of the remote UE by the 5G core network involves a plurality of steps:

Step 0a-0e: The remote UE, seeking access to one or more UE-to-Network relays and the REAR key, can send a UE policy provisioning request to an AMF. The request may include the capabilities of the remote UE, viz., ProSe capability, PC-5 capability, and so on. In an embodiment, the AMF can send a policy control update to the DDNMF or the PCF through service based interfaces. The AMF can send an N5gddnmf_UEpolicycontrol_update message to the DDNMF through a service based interface or the AMF can send an Npcf_UEpolicycontrol_update request message to the PCF through the Npcf interface. The messages allow the AMF to request for a policy required for ProSe UE Discovery, and materials relevant to the security of communication between the remote UE and a discovered UE-to-network relay.

The DDNMF can respond to the AMF by sending an N5gddnmf_UEpolicycontrol_update response, or the PCF to can respond to the AMF by sending or Npcf_UEpolicycontrol_update response. The UE policy control update response includes relevant information pertaining to discovery of a ProSe UE-to-network relay and security material for securing the communications between the remote UE and the ProSe UE-to-network relay.

The Npcf_UEpolicycontrol_update response further includes information that allows the AMF to identify the AUSF corresponding to the remote UE. The Npcf_UEpolicycontrol_update response includes the SKI. The PCF had obtained the SKI from the AUSF during the primary authentication of the remote UE with the 5G core network (described in FIG. 6). The PCF includes the SKI in the Npcf_UEpolicycontrol_update response, along with the relevant information pertaining to the discovery of the ProSe UE-to-network relay and the security material. The AMF can temporarily store the SKI (till the AUSF corresponding to the remote UE is identified. The AMF can deliver the relevant information pertaining to discovery of the ProSe UE-to-network relay and the security material to the remote UE.

In another embodiment the remote UE can send a message directly to the DDNMF over the PC-3 interface to obtain the relevant information pertaining to the discovery of the ProSe UE-to-network relay and the security material meant for securing the communications between the remote UE and the ProSe UE-to-network relay.

Step 1: The remote UE, on receiving the information pertaining to the discovery of the ProSe UE-to-network relay and the security material, can send a key request message to the AMF over a NAS message. The key request message can include a ProSe Remote access indication. The key request message can include a GUTI, wherein the GUTI is included if the GUTI has already been assigned to the remote UE by the 5G core network. The key request message further includes a SUCI, a GPSI, or any other UE ID.

Once the routing indicator is sent to the AMF, by the remote UE, the ProSe Remote access indication can be set to 1. This can indicate that there is a single UE-to-Network relay between the remote UE and the 5G core network, and there is a single hop involved in ProSe communication. Similarly, if there are multiple UE-to-Network relays between the remote UE and the 5G core network, multiple hops may be required for ProSe communication.

Step 2: On receiving, the key request message from the UE, the AMF can identify an AUSF that corresponds to (or is associated with) the remote UE. In an embodiment, the AMF can utilize the SKI, temporarily stored in AMF, for identifying the AUSF corresponding to the remote UE. The AMF can utilize the SKI for identifying the AUSF corresponding to the remote UE for enabling the remote UE to avail ProSe through one or more UE-to-Network relays (when the remote UE desires remote access).

Step 3: Once the AMF identifies the AUSF corresponding to the remote UE, the AMF can forward the key request message (comprising the ProSe Remote access indication, the GUTI (if assigned), the SUCI, the GPSI, the (remote) UE ID, and so on) to the AUSF corresponding to the remote UE. The AUSF is capable of key management for the ProSe UE-to-Network relay communication.

Step 4: Once the AUSF receives the forwarded key request message from the AMF, the AUSF can determine whether the actual sender of the key request message, i.e., the remote UE, is authorized to access the 5G core network through one or more UE-to-Network relay UEs. If the AUSF determines that the remote UE is an authorized UE, the AUSF may derive the REAR key and other additional keys for enabling the remote UE to secure communication with the 5G core network through the one or more UE-to-Network relay UEs, and providing the REAR key and the other additional keys to the remote UE.

In order to authorize the remote UE, requesting for the REAR key and the other additional keys, for remote access, the AUSF can send UE Authentication request, Nudm_UEAuthentication request, to the UDM, through the Nudm interface. The AUSF sends the UE Authentication request to the UDM for retrieving details pertaining to the remote UE and/or data subscription of the remote UE through the Nudm interface. The AUSF includes at least one of the ProSe Remote Access Indication, the 5G-GUTI (if assigned), the SUCI, the GPSI, and the IDs relevant to the remote UE, in the Nudm_UEAuthentication request.

Step 5: On receiving the UE authentication request from the AUSF, the UDM can check whether the remote UE is authorized to access the 5G core network through one or more UE-to-network relays. In an embodiment, the UDM can store the GPSI for authorizing the remote UE when communicating through the one or more UE-to-Network relay. If the UDM determines that the remote UE is authorized to access the 5G core network through the one or more UE-to-network relays, the UDM sends a SUPI to the AUSF, in a Nudm_UEAuthentication response message through the Nudm interface, which corresponds to the remote UE.

Step 6: On receiving the SUPI from the UDM, the AUSF can generate the REAR Key for enabling the remote UE to communicate with the 5G core network through the one or more UE-to-Network relays. The REAR key is utilized for deriving at least one additional ProSe key comprising the $K_{NR\_ProSe}$, the $K_D$, or the $K_{NRP}$.

Step 7: The AUSF can send the generated REAR key and the at least one additional ProSe key in a key response message to the remote UE through the AMF.

FIG. 8 depicts an example system 400 configured to identify an AUSF associated with a remote UE, derive authentication keys, by the AUSF, on verifying the remote UE, and distribute the authentication keys to the remote UE, according to embodiments as disclosed herein. As depicted in FIG. 8, the system 800 comprises a remote UE 801, an AMF 802, an AUSF 803, a PCF 804, and an UDM 805. In an embodiment, the AUSF 803 corresponding to the remote UE 801 can be identified based on routing indicator. In another embodiment, the AUSF 803 corresponding to the remote UE 801 can be identified based on SKI. The AMF 802 can identify the AUSF 803 corresponding to the remote UE 801 based on the routing indicator and the SKI.

The AUSF 803 is responsible for key management of the ProSe UE-to-Network relay communication. The AUSF 803 can authorize the remote UE 801 to access the 5G core network through one or more UE-to-network relays. The authorization of the remote UE 801 is performed based on the SUPI obtained from the UDM 805. The SUPI obtained from the UDM 805 corresponds to the remote UE 801. Once the remote UE 801 has been authorized, the AUSF 803 can derive keys that allow remote access to the (remote) UE 801 through the one or more UE-to-network relays. The keys derived by the AUSF 803 can be referred to as authentication keys. The derived keys include the REAR key, the $K_{NR\_ProSe}$, the $K_D$, and the $K_{NRP}$.

The remote UE 801 can receive a policy pertaining to discovery of at least one UE-to-network relay and security material, from the AMF 802, in response to a policy provisioning request. The remote UE 801 can send a UE policy provisioning request to the AMF 802, which includes capabilities of the remote UE 801 such as ProSe capability, PC-5 capability, and so on. The AMF 802 can send a policy control update to the PCF 804 for receiving the policy required for ProSe UE Discovery, and materials relevant to the security of communication between the remote UE and a discovered UE-to-network relay.

The PCF 804 can send a UE policy control update response to the AMF 802. The UE policy control update response includes information pertaining to discovery of a ProSe UE-to-network relay and security material for securing the communications between the remote UE 801 and the ProSe UE-to-network relay. The AMF 802 delivers the information pertaining to discovery of the ProSe UE-to-network relay and the security material to the remote UE 801. The remote UE 801 can send a key request message to the AMF 802 for remote access to the 5G core network. The key request message comprises at least one parameter that allows the AMF 802 to identify the remote UE 801 and the AUSF 803 corresponding to the remote UE 801. The at least one parameter includes a ProSe Remote access indication, a routing indicator, a GUTI, SUCI, GPSI, one or more UE IDs, and so on.

On receiving, the key request message from the remote UE 801, the AMF 802 can forward the key request message to the AUSF 803 corresponding to the remote UE 801 to the AUSF 803. However, in order to forward the key request message, the AMF needs to identify the AUSF 803 corresponding to the remote UE 801. In an embodiment, the AMF 802 can utilize the routing indicator, sent by the remote UE 801 in the key request message, for identifying the AUSF 803 corresponding to the remote UE 801.

In another embodiment, the AMF 802 can identify the AUSF 803 corresponding to the remote UE 801 based on a SKI. The AMF 802 can store a mapping between at least one identifier of the remote UE 801 and the SKI. The AMF 802 can link the SKI with the remote UE 801 on the basis of this mapping. Once the link between the remote UE 801 and the SKI is established by the AMF 802, the AMF 802 can identify the AUSF 803 corresponding to the remote UE 801, based on the SKI. The SKI allows AMF 802 to distinguish and route the key request message to the AUSF 803 corresponding to the remote UE 801.

The SKI can be obtained by the AMF 802 during primary authentication of the remote UE 801 with the 5G core network. The AMF 802 can either temporarily or permanently store the SKI. The SKI is derived by the AUSF 803 during the primary authentication of the remote UE 801. The AUSF 803 can send the SKI to the AMF 802 or the PCF 804. If the AUSF 803 sends the SKI to the PCF 804, then the PCF 804 sends the SKI to the AMF 802 and the AMF 802 temporarily stores the SKI.

The format of the SKI is identical to the format of a next generation Key Set Identifier (ngKSI). The SKI comprises a type field and a value field. The type field indicates the AUSF associated with the remote UE. The value field can be a three bit value. If the value field is '111' (decimal seven), then it indicates that $K_{AUSF}$ is not available. If the value field is '000', '001', '010', '011', '100', '101', or '110', then it indicates that $K_{AUSF}$ is available, and the $K_{AUSF}$ to which the SKI identifies.

Once the AUSF 803 receives the forwarded key request message from the AMF 802, the AUSF 803 can determine whether the original sender of the key request message (remote UE 801), is authorized to access the 5G core network through one or more UE-to-Network relays. In order to authorize the remote UE 801, the AUSF 803 can send a UE authentication request to the UDM 805. The UE authentication request is sent for retrieving details pertaining to the remote UE 801 and/or the data subscription of the remote UE 801. The AUSF 803 includes at least one of the ProSe Remote access indication, the routing indicator, the 5G-GUTI, the SUCI, the GPSI, and the IDs relevant to the remote UE 801, in the UE authentication request.

On receiving the UE authentication request from the AUSF 803, the UDM 805 can check whether the remote UE 801 is authorized to access the 5G core network through one or more UE-to-network relays. If the UDM 805 determines that the remote UE 801 is authorized to access the 5G core network through the one or more UE-to-network relays, the UDM 805 sends a SUPI to the AUSF 803. The SUPI corresponds to the remote UE 801. On receiving the SUPI from the UDM 805, the AUSF 803 can determine that the remote UE 801 is authorized for remote access to the 5G network through the one or more UE-to-Network relays. The AUSF 803 may derive the REAR key and other additional keys for enabling the remote UE 801 to securely communicate with the 5G core network through the one or more UE-to-Network relays.

The REAR key can be utilized for deriving additional ProSe key comprising the $K_{NR\_ProSe}$, the $K_D$, or the $K_{NRP}$. The AUSF 803 can send the generated REAR key and the additional keys in a key response message to the remote UE 801. The remote UE 801 can receive the REAR key from the AUSF 803 after the successful verification of the remote UE 801 by the AUSF 803.

FIG. 8 shows exemplary units of the system 800, but it is to be understood that other embodiments are not limited thereon. In other embodiments, the system 800 may include less or more number of units. Further, the labels or names of the units of the system 800 are used only for illustrative purpose and does not limit the scope of the invention. One or more units can be combined together to perform same or substantially similar function in the system 800.

The embodiments disclosed herein can be implemented through at least one software program running on at least one hardware device and performing network management functions to control the network elements. The network elements shown in FIG. 8 include blocks which can be at least one of a hardware device, or a combination of hardware device and software module.

The embodiments disclosed herein describe methods and systems for identifying, by an AMF, an AUSF associated with a UE; generating keys, by the associated AUSF, on determining that the UE is authorized for availing ProSe in a 5GS, and distributing the generated keys to the UE. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The device may also include means, which could be, for example, a hardware means, for example, an Application-specific Integrated Circuit (ASIC), or a combination of hardware and software means, for example, an ASIC and a Field Programmable Gate Array (FPGA), or at least one microprocessor and at least one memory with software modules located therein. The method embodiments described herein could be implemented partly in hardware and partly in software. Alternatively, the invention may be implemented on different hardware devices, e.g. using a plurality of Central Processing Units (CPUs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method for securing proximity services (ProSe) in a $5^{th}$ generation (5G) network, the method comprising:
   receiving, by a user equipment (UE), a policy pertaining to discovery of at least one ProSe relay UE or security of ProSe communication, from an access and mobility function (AMF), in response to a policy provisioning request;
   sending, by the UE, a key request message, to the AMF, for obtaining security keys and parameters for securing ProSe communication with a 5G core network through at least one ProSe relay UE; and
   receiving, by the UE, a remote access via relay (REAR) key and at least one security parameter, from the AMF, for securing the ProSe communication with the 5G core network through the at least one ProSe relay UE,
   wherein the REAR key is generated by an authentication server function (AUSF) associated with UE which is identified, by the AMF, using a source key identifier (SKI) stored in the AMF, and
   wherein a format of SKI comprises a type field indicating the AUSF associated with the UE and a value field indicating an association of the SKI with $K_{AUSF}$, and an availability of $K_{AUSF}$.

2. The method of claim 1, wherein the key request message comprises at least one of a ProSe remote access indication, a globally unique temporary identity (GUTI), a generic public subscription identifier (GPSI), a routing indicator, and a subscription concealed identifier (SUCI).

3. The method of claim 2, wherein the REAR key is received, by the UE, on successful verification of the UE by the AUSF associated with the UE, wherein the verification of the UE comprises:
   receiving, by the AUSF, the key request message from the AMF;
   sending, by the AUSF, a UE authentication request comprising at least one of the ProSe remote access indication, the GUTI, the SUCI, the GPSI, and the routing indicator, to a unified data management (UDM);
   generating, by the AUSF, the REAR key on receiving, from the UDM, a subscription permanent identifier (SUPI) in response to the UE authentication request, wherein the SUPI is received if the UE is authorized to access the 5G network through the at least one ProSe relay UE; and
   sending, by the AUSF, the REAR key to the AMF, wherein the AMF delivers the REAR key to the UE.

4. The method of claim 3, wherein the AUSF associated with the UE is identified, by the AMF, based on the routing indicator.

5. The method of claim 3, wherein the AMF checks a stored mapping between the SKI and at least on identifier of the UE, to route the key request message to the AUSF associated with the UE.

6. The method of claim 3,
   wherein the AMF obtains the SKI from the AUSF, associated with the UE, during primary authentication of the UE with the 5G core network, and
   wherein the SKI is derived by the AUSF along with $K_{AUSF}$ if the primary authentication is successful.

7. The method of claim 3, wherein the SKI is obtained, by the AMF, from a policy control function (PCF) while receiving the policy pertaining to the discovery of the at least one ProSe relay UE and the security of ProSe communication.

8. The method of claim 3,
   wherein the format of the SKI is identical to a format of a next generation key set identifier (ngKSI).

9. The method of claim 1, wherein the policy provisioning request includes at least one of a capability of the UE to avail ProSe through the 5G network, and availability of a functional PC-5 interface.

10. The method of claim 1, wherein the policy pertaining to the discovery of the at least one ProSe relay UE and the security of ProSe communication is obtained, by the AMF from a policy control function (PCF).

11. A user equipment (UE) for securing proximity services (ProSe) in a 5$^{th}$ generation (5G) network, the UE comprising:
memory; and
at least one processor coupled to the memory, wherein the at least one processor is configured to:
receive a policy pertaining to discovery of at least one ProSe relay UE or security of ProSe communication, from an access and mobility function (AMF), in response to a policy provisioning request;
send a key request message, to the AMF, for obtaining security keys and parameters for securing ProSe communication with a 5G core network through at least one ProSe relay UE; and
receive a remote access via relay (REAR) key and at least one security parameter from the AMF for securing the ProSe communication with the 5G core network through the at least one ProSe relay UE,
wherein the REAR key is generated by an authentication server function (AUSF) associated with UE which is identified, by the AMF, using a source key identifier (SKI) stored in the AMF, and
wherein a format of SKI comprises a type field indicating the AUSF associated with the UE and a value field indicating an association of the SKI with $K_{AUSF}$, and an availability of $K_{AUSF}$.

12. The UE of claim 11, wherein the key request message comprises at least one of a ProSe remote access indication, a globally unique temporary identity (GUTI), a generic public subscription identifier (GPSI), a routing indicator, and a subscription concealed identifier (SUCI).

13. The UE of claim 12, wherein the REAR key is received, by the UE, on successful verification of the UE by the AUSF associated with the UE, wherein the verification of the UE comprises:

receiving, by the AUSF, the key request message from the AMF;
sending, by the AUSF, a UE authentication request comprising at least one of the ProSe remote access indication, the GUTI, the SUCI, the GPSI, and the routing indicator, to a unified data management (UDM);
generating, by the AUSF, the REAR key on receiving, from the UDM, a subscription permanent identifier (SUPI) in response to the UE authentication request, wherein the SUPI is received if the UE is authorized to access the 5G network through the at least one ProSe relay UE; and
sending, by the AUSF, the REAR key to the AMF, wherein the AMF delivers the REAR key to the UE.

14. The UE of claim 13,
wherein the AMF checks a stored mapping between the SKI and at least on identifier of the UE, to route the key request message to the AUSF associated with the UE.

15. The UE of claim 14,
wherein the AMF obtains the SKI from the AUSF, associated with the UE, during primary authentication of the UE with the 5G core network, and
wherein the SKI is derived by the AUSF along with $K_{AUSF}$ if the primary authentication is successful.

16. The UE of claim 14, wherein the SKI is obtained, by the AMF, from a policy control function (PCF) while receiving the policy pertaining to the discovery of the at least one ProSe relay UE and the security of ProSe communication.

17. The UE of claim 14,
wherein the format of the SKI is identical to a format of a next generation key set identifier (ngKSI).

18. The UE of claim 11, wherein the policy provisioning request includes at least one of a capability of the UE to avail ProSe through the 5G network, and availability of a functional PC-5 interface.

19. The UE of claim 11, wherein the policy pertaining to the discovery of the at least one ProSe relay UE and the security of ProSe communication is obtained, by the AMF from a policy control function (PCF).

* * * * *